D. M. READ.
POCKET-BOOK LOCK.

No. 171,858.  Patented Jan. 4, 1876.

WITNESSES:
A. W. Almqvist
A. F. Terry

INVENTOR:
Daniel M. Read
BY
ATTORNEYS.

UNITED STATES PATENT OFFICE.

DANIEL M. READ, OF NEW YORK, N. Y.

IMPROVEMENT IN POCKET-BOOK LOCKS.

Specification forming part of Letters Patent No. 171,858, dated January 4, 1876; application filed July 3, 1875.

*To all whom it may concern:*

Figure 1:
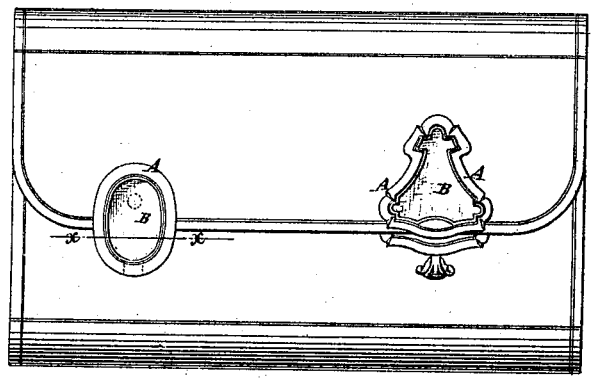
Figure 2:
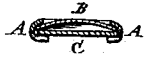

Be it known that I, DANIEL M. READ, of the city, county, and State of New York, have invented a new and Improved Pocket-Book Lock, of which the following is a specification:

Figure 1 is a front view of a pocket-book, showing two forms of my improved fastener, and Fig. 2 is a detail cross-section taken through the line $x$ $x$, Fig. 1.

Similar letters of reference indicate corresponding parts.

The object of this invention is to furnish an improved fastener for pocket-books and similar articles, which shall be so constructed that persons holding it in their hands can be enabled to see a reflection of their entire faces, and which at the same time shall be neat and ornamental in appearance.

The invention consists in the combination of the frame, the mirror, and the back plate with each other to form the body or top of the fastener, as hereinafter fully described.

The body or top of the fastener is formed of a frame, a mirror, and a back plate. The frame A is struck up into angular form to form a seat for the mirror B. The mirror B is made convex upon its outer or reflecting surface, so as to enable persons looking into it to see their entire faces. The curvature of the mirror B also prevents the metallic plate C, which is placed upon the rear side of the mirror B, from rubbing off the metallic substance which forms the reflector of said mirror. The mirror B and the plate C are kept in place in the angle of the frame A by points formed upon the rear edge of said frame, and which are bent down upon the said plate C.

The mirror B and plate C may be secured in place in the frame A by other means, if desired.

Having thus described my invention, I claim as new and desire to secure by Letters Patent—

As an article of manufacture, the pocket-book lock herein described, provided with a flap clamping or fastening plate, which consists of the frame A, mirror B, and the back plate C, as and for the purpose set forth.

DANIEL M. READ.

Witnesses:
    JAMES T. GRAHAM,
    JAMES H. HUNTER.